United States Patent [19]

Wang

[11] Patent Number: 4,935,985

[45] Date of Patent: Jun. 26, 1990

[54] RETURN APPARATUS

[76] Inventor: John Wang, No. 129, Tuan-Chu Lane, Tuan-Chu Li, Chiayi City, Taiwan

[21] Appl. No.: 357,336

[22] Filed: May 25, 1989

[51] Int. Cl.⁵ ............................................. F16F 5/00
[52] U.S. Cl. ........................................... 16/57; 16/66; 16/51; 267/64.26
[58] Field of Search ............... 267/64.26, 64.11, 64.22; 16/51, 56, 57, 58, 66, 49

[56] References Cited

U.S. PATENT DOCUMENTS

| | | | |
|---|---|---|---|
| 3,853,311 | 12/1974 | Kreuzer et al. | 267/64.26 |
| 3,944,198 | 3/1976 | Sakamoto | 267/64.26 |
| 4,029,306 | 6/1977 | Sakaguchi et al. | 267/64.26 |
| 4,405,119 | 9/1983 | Masclet et al. | 267/64.26 |
| 4,452,437 | 6/1984 | Lochner | 267/64.22 |

Primary Examiner—Richard K. Seidel
Assistant Examiner—James Miner
Attorney, Agent, or Firm—Lackenbach Siegel Marzullo & Aronson

[57] ABSTRACT

A return apparatus includes a first hollow cylindrical member and a second hollow cylindrical member sleeved in the first cylindrical member to create a telescoping movement in a sealed relationship. The first cylindrical member has a first and a second closed end to define a first sealed chamber. The second cylindrical member has a first closed end protruding beyond the first closed end of the first cylindrical member and a second closed end having a flange radially extended therefrom to seal and engage movably with the inner face of the first cylindrical member in the first chamber. A floating piston is mounted in the axial bore of the second cylindrical member defining a second chamber and a third chamber. The third chamber is provided with a compressible gas. The first and second chambers are filled with fluid under the pressure of the compressible gas. In this way, the second cylindrical member can be retracted to an original position after it is pulled outward by an axially external force.

1 Claim, 2 Drawing Sheets

RETURN APPARATUS

BACKGROUND OF THE INVENTION

This invention relates to a return apparatus, and particularly to one which can automatically return an article to an original position after said article is moved away by utilizing the restoring force of a compressible gas.

Return apparatuses have been widely used for automatically returning an article to its original position after said article is moved away. For example, a return apparatus is often mounted to a garage door so as to enable the door to be closed automatically after the door is opened. Such a return apparatus is actuated to return automatically by means of the restoring force of a spring. However, the spring of such a device is liable to break and/or accidentally injure the user.

SUMMARY OF THE INVENTION

It is therefore a main object of this invention to provide a return apparatus which is actuated to return automatically by the restoring force of a compressible gas that is safer than by a like apparatus which uses a spring.

Accordingly, a return apparatus of the present invention includes first and second hollow cylindrical members which are telescoped with each other in a sealed relationship. The first cylindrical member has a first and a second closed end to define a first sealed chamber. The second cylindrical member is sleeved by the first cylindrical member. The second cylindrical member has a first closed end protruding beyond the first closed end of the first cylindrical member and a second closed end having a flange radially extended therefrom which seals and movably engages with the inner face of the first cylindrical member in said first chamber. A floating piston is mounted in the axial bore of the second cylindrical member defining a second chamber and a third chamber. The third chamber is provided with a compressible gas. The first and second chambers are filled with fluid under the pressure of the compressible gas. In this way, the second cylindrical member can be retracted to an original position in the first cylindrical member after it is pulled outward by an axially external force.

BRIEF DESCRIPTION OF THE DRAWINGS

Other features and advantages of this invention will become apparent in the following detailed description of a preferred embodiment of this invention with reference to the accompanying drawings, in which.

DETAILED DESCRIPTION OF A PREFERRED EMBODIMENT

Figure 1:
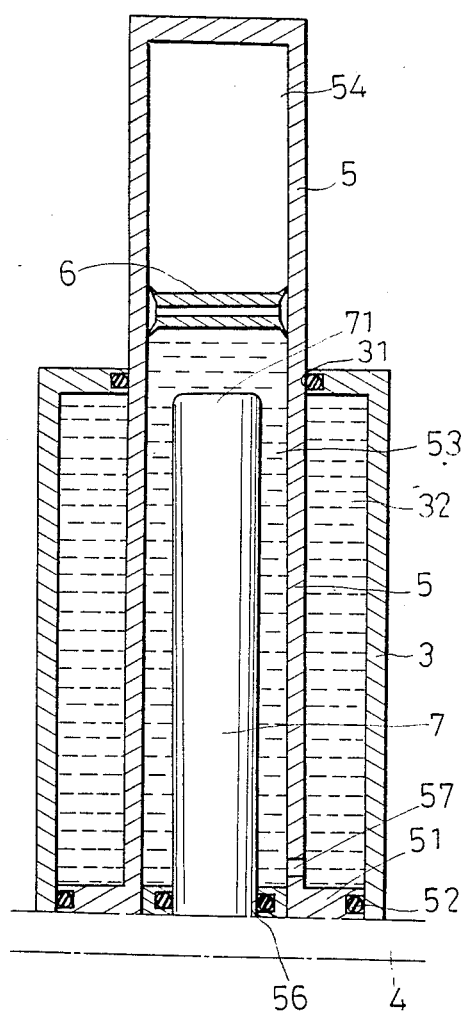
FIG. 1 is a sectional view of a preferred embodiment of a return apparatus of this invention.

Referring to FIG. 1, a sectional view of a preferred embodiment of a return apparatus of this invention is shown. The return apparatus includes a first hollow cylinder 3 having an upper closed end and lower open end which is fixed to a substantially plain surface of an object 4 (such as a wall, a door frame, etc.) so as to close the lower open end of the first cylinder 3 and define a first closed chamber 32. A central hole 31 is formed in the closed end of the first cylinder 3. A second hollow cylinder 5 with an upper and lower closed end passes through the central hole 31 creating an axial displacement in a sealed relationship with the first cylinder 3. The lower closed end of the second cylinder 5 has a flange 51 extended radially therefrom to seal and engage movably with the inner face of the first cylinder 3. An oil seal 52 is mounted between the flange 51 and the inner face of the first cylinder 3 for sealing purposes. A floating piston 6 in the second cylinder 5 divides the inner chamber of the second chamber 5 into a second chamber 53 and a third chamber 54 in the outer part of the second cylinder 5, so as to separate a cushion of compressed air or nitrogen in the third chamber 54 from the fluid which fills the first and second chambers 32, 53. A radial hole 57 is formed on the wall of the second cylinder 5 so as to communicate the fluid flow between the first and the second chambers 32, 53. A guiding rod 7 protrudes axially from the flat surface of the object 4 and slidably passes through a bore 56 formed in the lower closed end of the second cylinder 5 in a sealed relationship with the free end 71 thereof which extends into the second chamber 53 so as to guide the relative telescoping movement of the first and second cylinders. In addition, the guiding rod 7 occupies a space in the second chamber 53, thereby saving the quantity of the fluid which fills the first and second chambers. When the second cylinder 3 is in a released position, the flange 51 of the second cylinder 5 rests on the inner face of the lower closed end of the first cylinder 3 under the pressure of the compressible gas.

Figure 2:
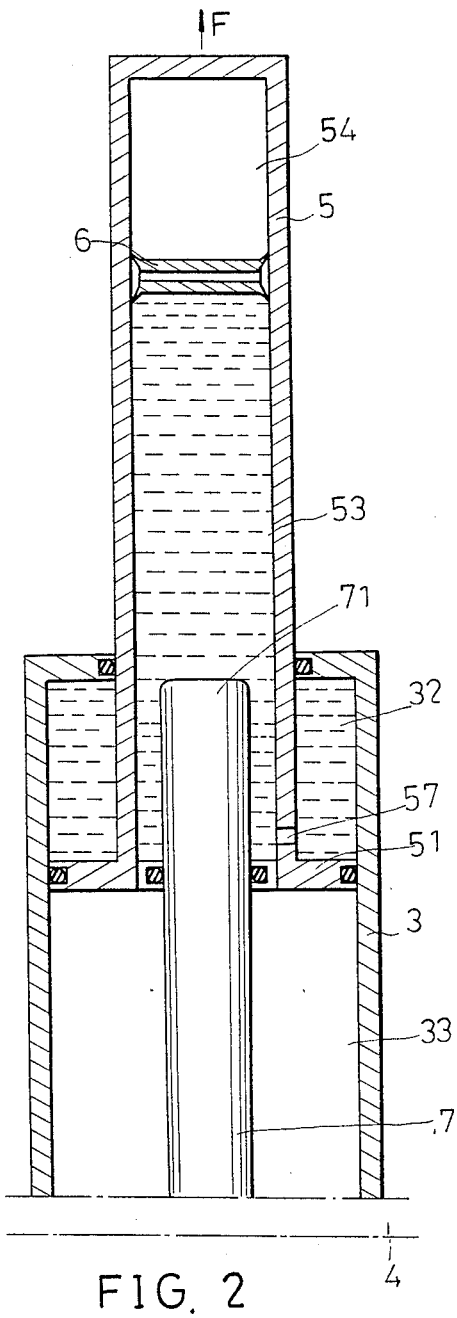
FIG. 2 is a sectional schematic view showing the return apparatus of this invention in an operative position.

Referring to FIG. 2, the second cylinder 5 is pulled outwardly relative to the first cylinder 3 by an axially outward external force (F). During this process, the flange 51 of the second cylinder 5 moves upward and forces the fluid in the first chamber 32 into the second chamber 53 via the radial hole 57 so as to compress the compressible gas in the third chamber 54. Meanwhile, a substantial vacuum chamber 33 is formed between the flange 51 and the surface of the object 4. When the external force (F) is removed, the fluid in the second chamber 53 will flow into the first chamber 32 via the radial hole 57 so as to push the flange 51 and thereby the second cylinder 5, to move downward to an original position as illustrated in FIG. 1. During this automatic-return process, the vacuum state in the vacuum chamber 33 facilitates the downward movement of the second cylinder 5. Since the return process is accomplished by using the restoring force of the compressible gas and the hydraulic characteristic of the fluid, the return motion is more stable and smooth than by the use of a spring.

With this invention thus explained, it is apparent that numerous modifications and variations can be made without departing from the scope and spirit of this invention. It is therefore intended that this invention be limited only as indicated in the appended claims.

I claim:

1. A return apparatus comprising:
   a first hollow cylindrical member having first and second closed ends defining a first sealed chamber;
   a second hollow cylindrical member with a first and a second closed end coaxially telescoped within said first cylindrical member, said first closed end of said second cylindrical member protruding beyond said first closed end of said first cylindrical member, said second closed end of said second cylindrical member having a flange radially extended therefrom to seal and engage movably with an inner face of said first cylindrical member, said second cylindrical member having an axial chamber formed therein, a floating piston mounted in said axial chamber so as to axially divide said axial chamber into a second chamber and a third chamber in which a compressible gas is contained, and a radial hole formed thereon communicating said first chamber and said second chamber during the relative movement of said first and said second cylindrical members;

said first cylindrical member having a guiding rod projecting axially and inwardly from said second closed end thereof, and said second closed end of said second cylindrical member having a bore formed therein, said guiding rod passing through said bore of said bore of said second cylindrical member into said second chamber and being sealed by sealing means and movably telescoped with said second cylindrical member;

fluid filling said first and second chambers under the pressure of said compressible gas; whereby said second cylindrical member is movably outwardly relative to said first cylindrical member by applying an axially outward external force thereon and returnable to its original position when the second cylindrical member is released.

* * * * *